INVENTORS:
JOHN RALPH WYCHERLEY
MICHAEL CHARLES PROUDMAN
ALAN CHARLES CLARE

BY Kurt Kelman
AGENT

INVENTORS:
JOHN RALPH WYCHERLEY
MICHAEL CHARLES PROUDMAN
ALAN CHARLES CLARE
BY Kurt Kelman AGENT

United States Patent Office 3,469,182
Patented Sept. 23, 1969

3,469,182
FLAW DETECTING APPARATUS WITH MECHANICAL SCANNING OF DETECTION MEANS
John Ralph Wycherley, Penn, Wolverhampton, Michael C. Proudman, Bridgnorth, and Alan C. Clare, Sutton Coldfield, England, assignors to G.K.N. Group Services Limited, Smethwick, Stafford County, England, a British company
Filed June 23, 1967, Ser. No. 648,306
Int. Cl. G01r 33/12
U.S. Cl. 324—37    4 Claims

ABSTRACT OF THE DISCLOSURE

A flaw detection apparatus having a plurality of field coils each enclosing two detector coils and spaced apart laterally across the feed path for a metal billet or slab, the field coils being energised with high frequency alternating current, and the field coils and pick-up coils collectively being moved to and fro transversely of the feed path by motor driven eccentric elements.

BACKGROUND OF THE INVENTION

Field of the invention

This invention relates to an apparatus for the detection of cracks or other similar flaws in coherent solids. Such solids may be in the form of blocks, sheets or other forms of stock from which articles are made, or may be in the form of the articles themselves or parts thereof, subject to such articles presenting surfaces suitable for subjection to the flaw detection method or for use with the apparatus, all as hereinafter described, such stock or articles hereinafter being referred to for convenience as workpieces.

One of the most commonly occurring types of flaw which it is required to detect by the method and by the use of the apparatus is in the form of a crack. Such cracks are often of extremely small size so that they are incapable, or not readily capable, of being detected by visual inspection. Another type of flaw required to be detected is that which results from an abrupt change in the composition of the material of which the workpiece is formed, such, for example, as an impurity embedded or included in the material of the workpiece.

A particular form of workpiece in relation to which the invention has been developed is a metal billet. This normally comprises an elongated block of metal of prismatic shape, for example square or rectangular in a cross sectional plane at right angles to its length. Each of the side faces of the billet may require to be examined for the presence of flaws, most of which are in the form of cracks having their lengths extending longitudinally of the billet.

A further form of workpiece relative to which the invention has been developed is a slab of metal, that is to say a piece of metal of plate-like form presenting two opposed surfaces, the dimensions of which are in two mutually perpendicular directions herein called the length and width for convenience, both large compared with the thickness.

Billets and metal slabs are produced by processes which ordinarily involve the movement of these forms of workpiece along a feed path in a direction parallel to their lengths. The speed of movement along the feed path is dictated by requirements of the production process other than the method of flaw testing of the kind specified which may be applied to the workpieces.

Consequently each elemental length of the workpiece (by which is meant a length containing the shortest length of flaw which it is required to detect) will necessarily pass through a detection station in a given period of time, and it is necessary that the whole of the elemental area of the surface of the workpiece bounded by this elemental length and by the entire width of the workpiece shall be effectively scanned by the detection means during this time period.

Metal billets vary appreciably in their cross sectional dimensions, and hence in the dimensions of their side faces, and typically the width of the side face to be examined may be from 2 inches up to 5 inches or more and very much wider in the case of metal slabs.

The scanning of the surface of the workpiece requires relative movement to be effected between the detection means on the one hand and the workpiece on the other hand and certain problems are encountered as the width of the surface to be scanned increases. In particular, if the relative movement is reciprocating movement the relative acceleration and deceleration of the detector means increases to a value at which high stresses are involved in transmitting the movement and substantial unbalanced forces are created which can lead to unwanted vibration interfering with the proper functioning of the detector means.

Description of the prior art

In our prior United States Patent 3,281,667 we have disclosed an apparatus for flaw testing workpieces of electrically conductive material comprising:

(A) Guide means defining a feed path for said workpiece through a detector station.

(B) A detector head at said station including:

(i) A field coil having an end face arranged in closely spaced at least approximately parallel relation to the surface of said workpiece to overlie an elemental area of said surface, (ii) At least a pair of pick-up coils having end faces also arranged in closely spaced at least approximately parallel relation to said surface and each of a smaller area than the field coil, and disposed within it as viewed normal to said surface, in respective positions spaced from each other in a predetermined direction to overlie different portions of said elemental area, said pick-up coils being connected in opposition, (iii) Said field coil and said pick-up coil end faces being substantially the same distance from said surface.

(C) A source of high frequency alternating electric current forming a carrier, said source being connected with said field coil to set up an alternating magnetic field in a surface layer of said workpiece at said surface thereof and at said detection station to induce a predetermined eddy current pattern in circuits afforded by this layer in said elemental area, whereby voltages are induced in said pick-up coils of a magnitude and phase dependent on said eddy current pattern.

(D) Mechanical means for effecting relative scanning movement in said predetermined direction between said workpiece on the one hand and said detector head on the other hand to cause said workpiece to move past said field coil and said pickup coils without movement through them.

(E) Said field coil and said pick-up coils having inductive coupling with said circuits in said surface layer of the workpiece through a magnetic field path, said path containing only non-magnetic and electrically non-conductive material.

(F) Indicator means connected with said pickup coils and including amplifier means and de-modulator means for separating from said carrier a modulation component of alternating voltages induced in said pick-up coils respectively and produced in response to said relative movement whenever a flaw in said surface layer passes said field coil and pick-up coils.

Two forms of apparatus were disclosed of which the first was designed specifically for flaw testing workpieces in the form of metal rod or wire, the detector head with the field coil and pick-up coils being rotatably mounted coaxially with the feed path along which such rod or wire was caused to advance as defined by the guide means of the apparatus.

The second specific form of apparatus disclosed was intended for detection of flaws in the surface of a workpiece of plane-faced form. Such apparatus included a head element incorporating the field coil and pick-up coils carried by an arm which was caused to oscillate from one lateral boundary of the surface to the other lateral boundary of the surface of the workpiece, while the latter was undergoing feed movement in a direction generally longitudinally of said boundaries.

This last mentioned form of apparatus involved the disadvantages especially as to the existence of substantial unbalanced forces and high stresses inherent in acceleration and deceleration of the head, having regard to the fact that the latter required to be moved extremely rapidly from one lateral boundary of the workpiece to the other in order to eliminate the possibility of flaws remaining undetected.

The object of the present invention is to provide an improved flaw detection apparatus which is better adapted to meet these problems.

SUMMARY OF THE INVENTION

According to the invention a flaw detection apparatus comprises means defining a feed path for the workpiece through a detection station, energising means thereat for establishing flow of an energising medium in the workpiece under test, and detector means at the detection station for sensing and producing electrical flaw signals in response to departures from a normal flow path or pattern of the energising medium in the workpiece under test, and detector means at the detection station for sensing and producing electrical flaw signals in response to departures from a normal flow path or pattern of the energising medium in the workpiece corresponding to absence of any flaw, characterised in that the detector means comprises a plurality of detector elements spaced relatively to each other across the width of the feed path to lie in respective laterally successive detection zones each extending longitudinally of the feed path and collectively covering the area over which flaw detection is required to be effected.

The detector elements may be movable by a motor driven scanning mechanism in a direction transversely of the feed path, in each case to such extent only that there is only a small lateral overlap, if any, between detection zones pertaining to successive detection element.

In one such arrangement the detector elements are carried by a mounting member extending transversely of the feed path, such mounting member being associated operatively with at least one eccentric element driven rotatably by said motor to have at least a component of movement to and fro in a direction transversely of the feed path.

Advantageously the mounting member is connected operatively at positions spaced apart along its length with two eccentric elements driven rotatably by said motor.

Although it is contemplated that the invention may be applied broadly to various forms of energising medium, for example alternating magnetic flux of relatively low frequency which penetrates deeply into the interior of the workpiece, or possibly to apparatus wherein the energising medium is in the form of high frequency stress waves, for example of ultrasonic frequency, the invention is primarily applicable to apparatus wherein the energising medium is a high frequency alternating current set up in the surface layer of the workpiece in the form of an eddy current pattern. In this case a preferred form of the apparatus is one in which the energising means comprises a plurality of field coils each overlying an elemental area of the surface of the workpiece when the latter is situated at the detection station, said coils being equal in number to the number of detector elements and fed with a source of high frequency alternating current forming a carrier to set up an alternating magnetic field in the surface layer of the workpiece to induce a predetermined eddy current pattern in circuits afforded by this layer, each of the detector elements comprising a plurality of pick-up coils arranged close to and parallel or approximately parallel to the surface of the workpiece within said elemental area, said coils having inductive coupling with said circuits, the apparatus further comprising electrical channels operatively connected respectively to the pick-up coils of respective detector elements and including de-modulator means for separating from the carrier the modulation component of the alternating voltages induced in the pick-up coils respectively and produced as a result of relative movement whenever a flaw passes the coils and including signal utilisation means.

BRIEF DESCRIPTION OF DRAWINGS

The invention will now be described by way of example with reference to the accompanying drawings wherein.

DESCRIPTION OF THE PREFERRRED EMBODIMENT

Figure 1:
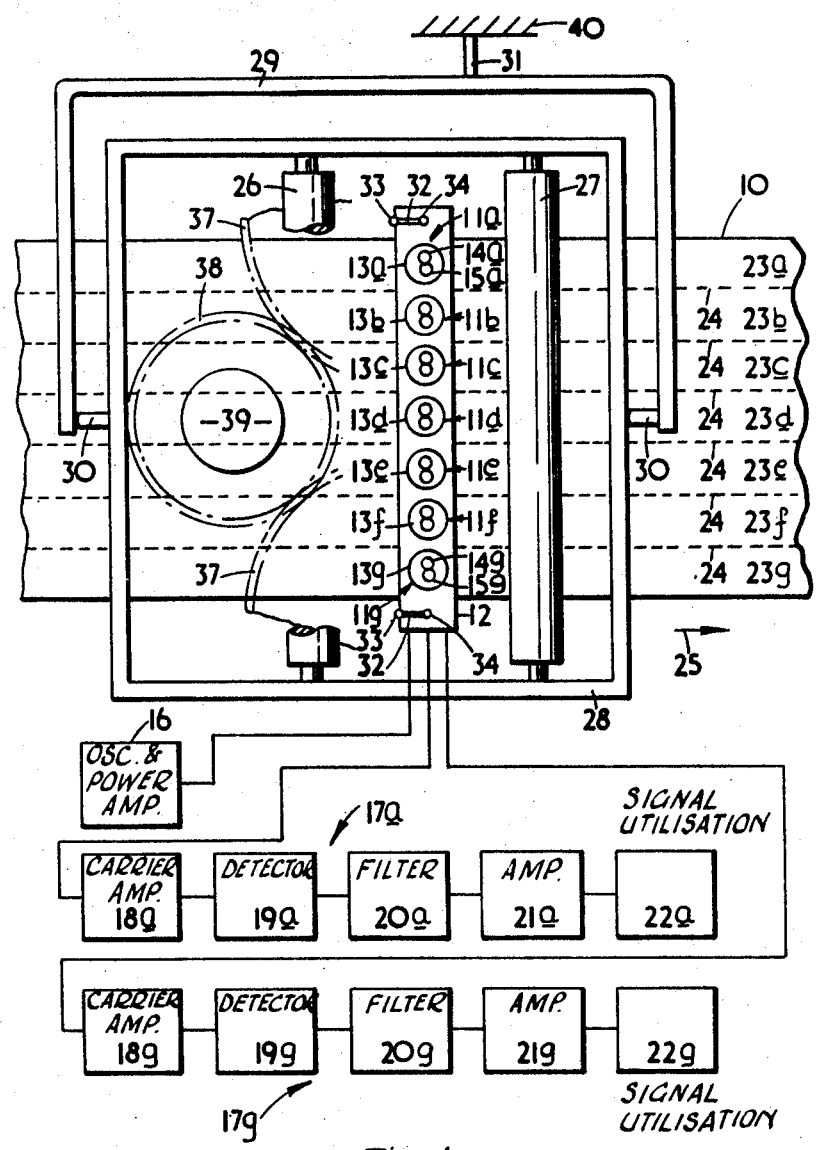
FIGURE 1 is a view of one form of flaw detection apparatus in accordance with the invention, the electrical circuits being shown schematically and the scanning mechanism and mounting arrangements for the detector elements being shown diagrammatically.
Figure 2:
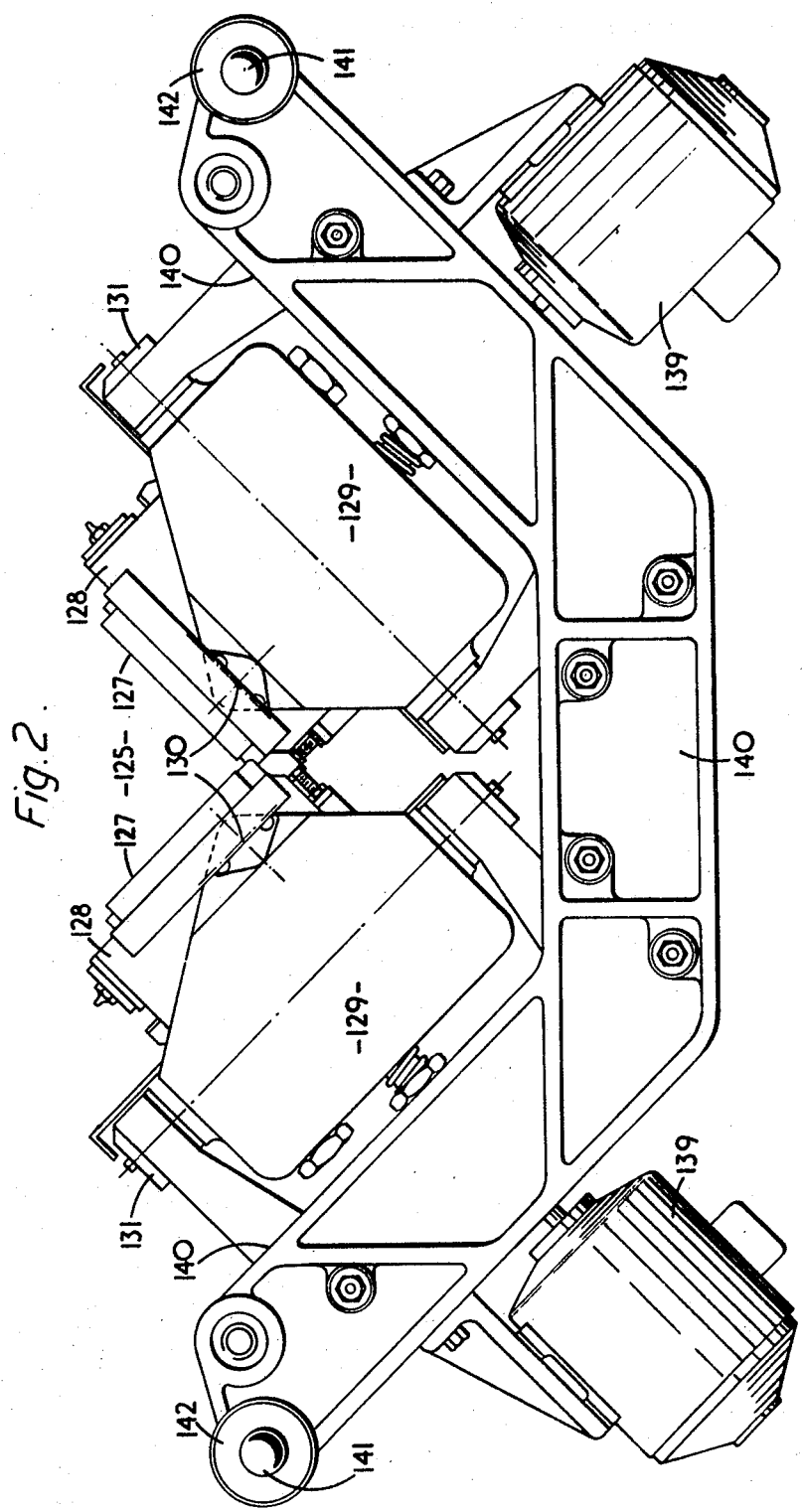
FIGURE 2 is a view in end elevation, that is to say viewed longitudinally of the feed path, of one constructional form of flaw detection apparatus embodying the principle illustrated in FIGURE 1 with the detector elements arranged to detect flaws on each of two adjacent faces of a billet or other rectangular section workpiece.
Figure 3:
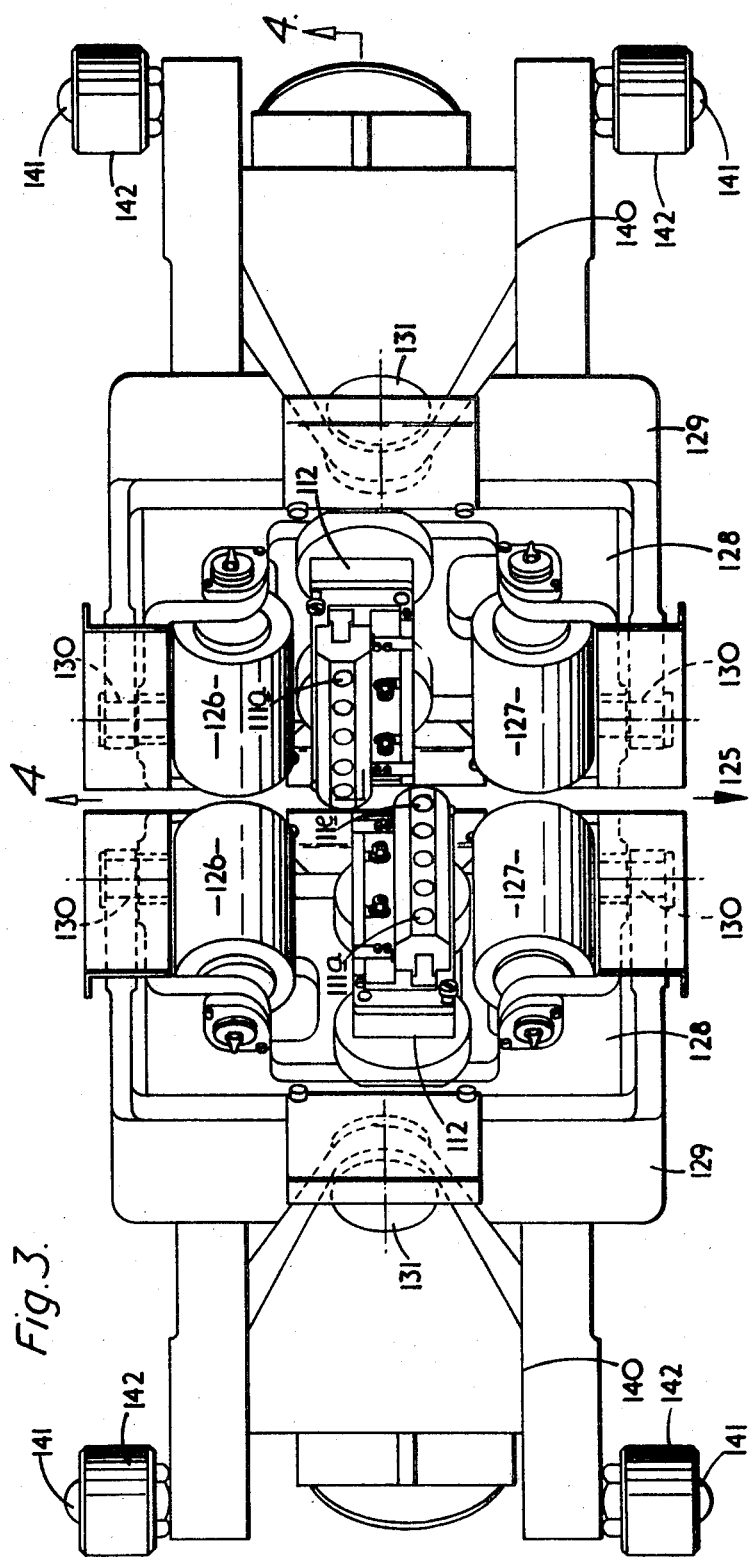
FIGURE 3 is a plan view of the apparatus illustrated in FIGURE 1.
Figure 4:
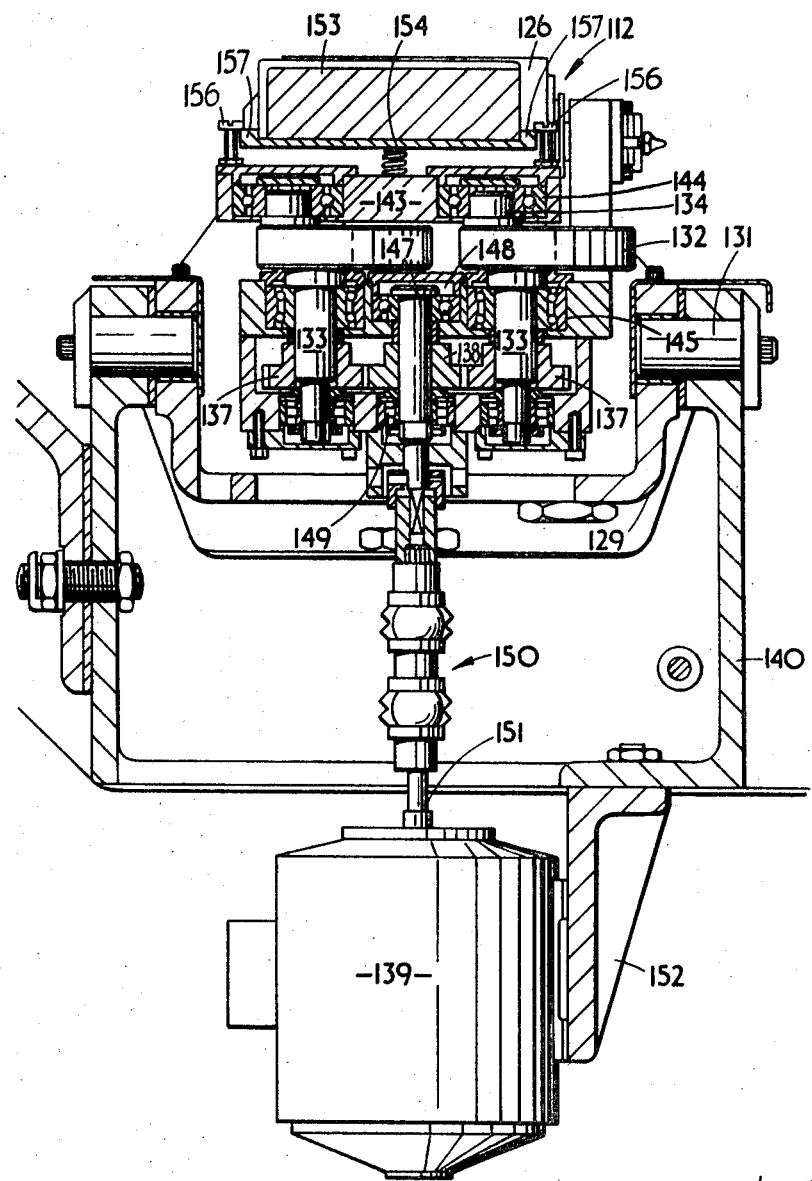
FIGURE 4 is a fragmentary view on an enlarged scale and in cross section on the line 4—4 of FIGURE 3.
Figure 5:
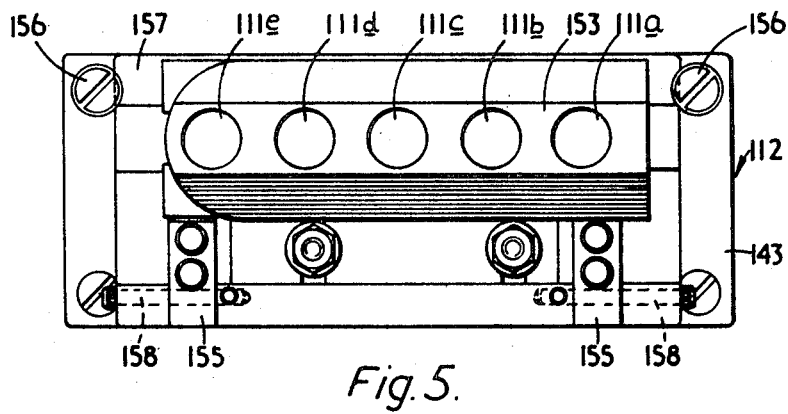
FIGURE 5 is a fragmentary view on an enlarged scale of one of the detector head units incorporated in the apparatus of FIGURES 3 and 4 as viewed normal to the end faces of the pick-up and field coils of this unit.
Figure 6:
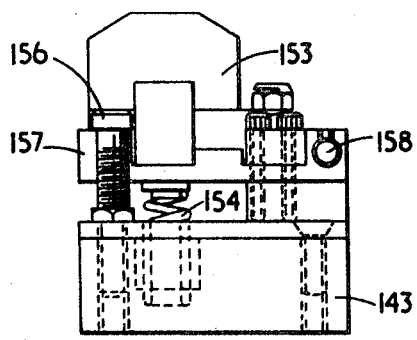
FIGURE 6 is a view in end elevation of the unit shown in FIGURE 5.

Referring firstly to FIGURE 1, the workpiece 10 in which flaws are required to be detected may be a metal billet, such for example as a ferrous metal billet of square or rectangular shape in cross section.

It will be understood that while for simplicity the apparatus illustrated in FIGURE 1 is suitable for detection of flaws in the surface layer of metal adjacent to one face only of the billet, practical forms of such apparatus conveniently provide for flaw detection in surface layers adjacent to at least two faces and possibly all the faces of the billet.

The apparatus comprises a plurality of detector elements indicated generally at 11a to 11g and each including two pick-up coils 14a, 15a to 14g, 15g surrounded by an energising means in the form of a field coil 13a to 13g. Although for clarity shown deliberately of large size in FIGURE 1, the diameter of each field coil may typically be 0.4 inch and each pick-up coil may be 0.06 inch in diameter. Either the field coil or the detector coils or both may be formed as printed circuit elements, and in this case may be either single turn coils or multi-turn coils, in the latter case of spiral formation or formed as helixes on the circumferential face of a cylindrical core.

The detector or pick-up coils such as 14a, 15a are disposed within the area enclosed by the associated field coil, such as 13a, as viewed in a plane normal to the coils. Both the field coil and the pick-up coils when in use lie in a plane which is parallel or approximately parallel to the face of the billet under examination and separated therefrom by a small gap, for example 0.03 to 0.10 of an inch.

The field coil and the pick-up coils may be supported in material which is non-magnetic. Alternatively a rod of a material having low hysteresis and eddy current loss such as feroxcube may be mounted within each pick-up coil. Such rod may have its exposed or inner end spaced from the surface of the billet 10 by a gap of the dimensions above mentioned. These rods tend to concentrate the magnetic linkage between an eddy current pool formed as hereinafter mentioned in the surface layer of the billet and the two pick-up coils.

Each of the field coils 13a to 13g is connected to a source of high frequency alternating current furnished, for example, by an oscillator and power amplifier 16 which serves to supply all of these coils. The frequency of the current is such as to induce eddy currents in the surface layer of the billet 10 and a typical range of frequency which may be employed satisfactory for this purpose is from 1 kc./s. to 500 kc./s.

Each detector element consisting of a pair of associated pick-up coils such as 14a and 15a is connected to a respective electrical channel of which two only 17a and 17g are illustrated for simplicity.

The associated pick-up coils are connected in opposition to have zero voltage and current output when no flaw is present in the surface layer of the workpiece. Each channel contains a carrier amplifier such as 18a, a detector or de-modulator 19a (which may be a phase-sensitive detector), a low pass filter 20a for attenuating the carrier frequency and higher frequencies and passing the modulation frequency unattenuated, an amplifier 21a, and a signal utilisation device 22a providing visual or audible indication of the existence of a flaw or may be a marking device for applying a marking medium, such as a paint spray, to the particular area of the billet containing the flaw. Corresponding units in the channel 17g are designated by corresponding references. A feed path past the detection station adjacent to which the pick-up coils such as 14a, 15a are disposed as defined by sets of rolling surfaces presented by two rollers 26 and 27, of which the former is situated upstream of the pickup coils and the latter downstream, the direction of feed of the billet being indicated by the arrow 25.

To permit the pick-up coils and field coils collectively to follow, and hence to be maintained at a predetermined spacing from the surface of the workpiece, the rollers 26 and 27 are supported in a gimbal structure comprising an inner frame 28 which can pivot about an axis extending longitudinally of the feed path and parallel to the surface of the billet as defined by bearings 30. The gimbal structure includes an outer frame member 29 which can pivot about an axis at right angles to the feed path and parallel to the surface of the billet as defined by a bearing 31.

The pick-up coils and the field coils are collectively carried by a mounting member 12 in the form of a piece of non-magnetic and electrically insulating material, for example an aluminum oxide ceramic, extending at right angles to the feed path.

The mounting member 12 is carried by two ececntric elements 32 rotatable about axes 33 and having a rotary connection about axes 34 with the mounting member 12.

The rotary elements 32 are driven rotatably in the same direction of rotation from a drive motor such as an electric motor 39 through a gear wheel 38 meshing with two gear wheels 37 drivingly connected with the eccentric elements 32 respectively.

The eccentricity or distance between the axes 33 and 34 is equal to or slightly greater than half the width of each detection zone 23a to 23g in which respective detector elements 11a to 11g operate.

In the constructional form of apparatus illustrated in FIGURES 2 to 6, parts corresponding to those already described are designated by like numerals of reference with the prefix 1 so as to lie in the range 110 to 199 and the preceding description is to be deemed to apply.

In this embodiment of the apparatus the feed path is indicated at 125 and is bounded laterally by mounting members 112 carrying detector elements 111a to 111e arranged in V formation.

Rollers 126 and 127 at each lateral boundary of the feed path are supported by inner frame members 128 of the gimbal structure which in turn are supported by outer frame members 129.

The outer frame members 129 are carried through the intermediary of the bearings 131 by a cradle member 140. Although not illustrated the member 140 may be mounted for rising and falling movement relatively to a frame including two upright end frame members between which the cradle member 140 is received and which have inwardly presented flat plane guide plates to engage with balls 141 carried in housings 142 on the cradle member. The latter is suspended by tie rods from a cross head at the upper end of the frame. The guide plates and balls provide positive constraint against displacement of the cradle member in a direction longitudinally of the feed path 125 while affording freedom for the cradle member to rise and fall and also move horizontally to allow the rollers 126 and 127 to engage adjacent faces of a billet advanced along the feed path by feed means external to the apparatus.

The frame may thus be generally as disclosed in the specification of United States Letters Patent 3,416,364.

The mounting members 112 each comprise a base plate 143 having bearing openings in which are disposed bearing units 144, the inner races of which receive and are carried on crank pins 134 of crank wheels 132. The crank wheels in turn are journalled in ball bearings 145 through which the spindles 133 of the crank wheels extend, the bearings 145 being supported in the inner frame member 128 of the gimbal structure.

The spindles 133 carry gear wheels 137 drivingly connected therewith respectively, said gear wheels meshing with a common gear wheel 138 on a spindle 147 carried in bearings 148 and 149 of the inner frame member 128.

The spindle 147 is coupled to the electric drive motor 139 through a universal coupling 150 which provides the requisite freedom of movement of the spindle 147 relative to the output shaft 151 of the motor 139, having regard to the fact that the latter is carried by a bracket 152 on the cradle 140, whereas the spindle 147 is supported by the inner frame 128 of the gimbal structure.

The base member 143 of the mounting member 112 carries a detector head unit 153 including an appropriate number of detector elements as indicated at 111a to 111e. The unit 153 is urged upwardly by a coiled compression spring 154 acting between the underside of the unit and the base member 143. The unit 153 is rockable about the axis afforded by pins 158 passing through lugs 155 and is positionally controlled by clamping screws 156 screwing into the base member 143 and having heads overlapping marginally with a flange 157 at the base of the unit 153.

This mounting arrangement enables the gap between the surface of the billet or other workpiece, which surface is tangential to both rollers 126 and 127, to be accurately adjusted.

Electrical connections to the pick-up coils and field coils may be effected through the intermediary of flexible leads or, if desired, through transformers which include relatively movable primary and secondary windings accommodating the movement of the mounting member 12. The units included in the channels may therefore be stationary mounted remotely from the mechanical parts of the apparatus as illustrated in FIGURES 3 to 6.

In operation, the mounting member 12 or 112, as the case may be, is moved by the eccentric elements 32 or 132 in such a manner that each point on the mounting is moved circularly in conformity with the radius or eccentricity of the eccentric element, and the mounting member therefor executes orbital movement in a circular path while remaining at right angles to the feed path.

The extent of the lateral excursion of each detector element 11a to 11e or 111a to 111e is such that it is capable of detecting a flaw within the confines of the longitudinally extending zone 23a to 23g within which it operates.

In practice, each detector element is capable of detecting flaws occuring within the area bounded by the field coil such as 13a, and may also be capable of detecting flaws just outside this area. Therefore if the eccentric elements have an eccentricity which is equal to half the width of each zone, such as 23a, or a little greater than half this width, there can be some marginal overlap between successive zones. Their lateral boundaries are indicated diagrammatically by the broken lines 24.

Predominantly flaws tend to be in the form of cracks or fissures extending generally longitudinally of the billet that is to say more or less parallel to the feed path, while the pick-up coils such as 14a, 15a are spaced apart transversely of the feed path. Under normal conditions, that is when no flaw is present, the general pattern of eddy currents set up in the surface layer of the workpiece tends to be circular, in conformity with the configuration of the field coil 13a, and induce equal and opposite voltages in the pick-up coils 14a, 15a. When symmetry of the eddy current pattern about a longitudinal axis tangential to the two pick-up coils and passing medially between them is disturbed there is a resultant induced voltage in the pick-up coils which is fed to the appropriate channel 13a to cause operation of the signal utilisation device 22a.

The speed of rotation of the drive motor 39 should be such that each detector element makes an excursion from one lateral boundary of its detection zone, such as 23a to the other lateral boundary thereof during the time interval taken by the shortest flaw required to be detected in passing the detection station, assumed, for this purpose to be represented by an axis extending medially of a mounting member 12 or 112 at right angles to the feed path.

We claim:

1. Flaw detection apparatus for metal workpieces, such as metal billets or plates presenting faces having dimensions of length and width which are both large compared with the dimensions of the flaws to be detected, said apparatus comprising a supporting structure defining a feed path for the advancement of said workpieces in the direction of the length of said faces thereof, field coil means at a detection station adjacent to said feed path, an alternating electric current source of high frequency forming an electrical carrier and connected to said field coil means, detector coil means at said detection station, and de-modulator means operatively connected with said detector coil means to detect flaw signal modulation of said carrier, said apparatus including the improvement wherein:
   (a) said supporting structure includes a mounting means extending transversely of said feed path at said detection station,
   (b) said field coil means includes a plurality of field coils carried by said mounting means at positions spaced apart transversely of said feed path,
   (c) said detector coil means includes a plurality of sets of pick-up coils also carried by said mounting means with the coils of each such set disposed within the area of a respective one of said field coils,
   (d) said supporting structure further includes scanning mechanism operatively connected to said mounting means for moving said mounting means with said field coils and pick-up coils back and forth in a direction laterally of said feed path by an amount sufficient at least to product excursions of each field coil and its associated set of pick-up coils to the lateral boundaries of a detection zone pertaining to such field coil and pick-up coils and contiguous or overlapping with adjacent like detection zones pertaining to adjacent field and pick-up coils,
   (e) motor means operatively connected through transmission means with said scanning mechanism for driving same.

2. The improvement according to claim 1 wherein:
   (a) said scanning mechanism comprises rotary eccentric elements supported for rotation in respective bearings carried by said supporting structure and themselves provided respectively with further bearings disposed in eccentric relation to the first said bearings respectively and at corresponding angular positions in relation thereto,
   (b) said mounting means comprises a mounting member supported from said eccentric elements through said further bearing means.

3. The improvement according to claim 2 wherein:
   (a) said supporting structure includes a gimbal structure having an outer frame member and an inner frame member,
   (b) one of said frame members is pivotally mounted in said supporting structure for movement angularly about an axis extending lengthwise of said feed path and the other of said frame members is pivotally mounted in said supporting structure for movement angularly about an axis extending transversely of said feed path,
   (c) said inner frame member carries the bearings which support said rotary eccentric elements,
   (d) said inner frame member also carries roller means at positions spaced lengthwise of said feed path upstream and downstream respectively of said mounting member.

4. The improvement according to claim 1 wherein:
   (a) said mounting member executes orbital movement in a circular path while remaining at right angle to the feed path.

References Cited

UNITED STATES PATENTS

| | | | |
|---|---|---|---|
| 2,077,380 | 4/1937 | Drake | 324—37 |
| 3,247,453 | 4/1966 | Quittner | 324—37 |
| 3,263,809 | 8/1966 | Mandula et al. | 324—37 |
| 3,271,662 | 9/1966 | Quittner | 324—40 |
| 3,281,667 | 10/1966 | Dobbins et al. | 324—40 |
| 3,311,819 | 3/1967 | Miller | 324—37 |

RUDOLPH V. ROLINEC, Primary Examiner

R. J. CORCORAN, Assistant Examiner